Sept. 30, 1969        J. M. DELI        3,469,891
TRACK JOINT HAVING FLOATING SEAL
Original Filed Jan. 24, 1967        2 Sheets-Sheet 1
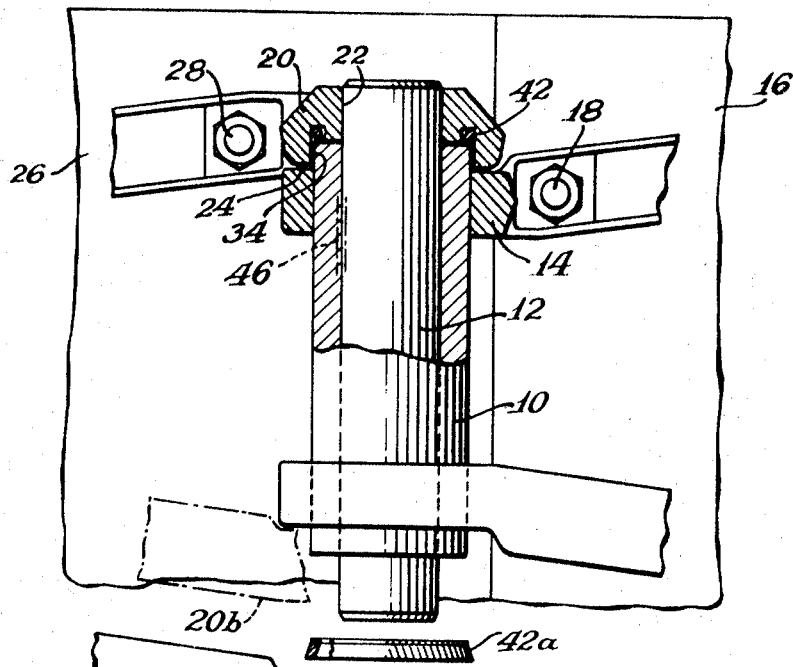
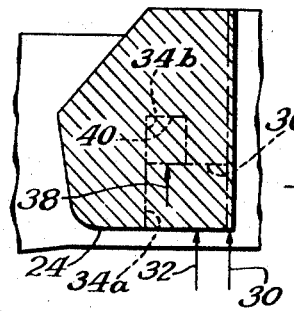
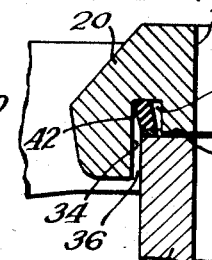
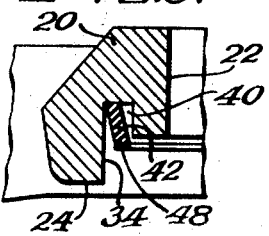
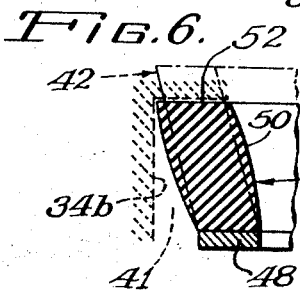
Inventor:
Jack M. Deli Sept. 30, 1969　　　　J. M. DELI　　　　3,469,891

TRACK JOINT HAVING FLOATING SEAL

Original Filed Jan. 24, 1967　　　　2 Sheets-Sheet 2

Inventor:
Jack M. Deli
John W. Gaines
Atty.

United States Patent Office 3,469,891
Patented Sept. 30, 1969

3,469,891
TRACK JOINT HAVING FLOATING SEAL
Jack M. Deli, Wheaton, Ill., assignor to International Harvester Company, Chicago, Ill., a corporation of Delaware
Original application Jan. 24, 1967, Ser. No. 611,463, now Patent 3,437,385, dated Apr. 8, 1969, which is a continuation-in-part of application Ser. No. 576,152, Aug. 30, 1966. Divided and this application July 11, 1968, Ser. No. 752,434
Int. Cl. B62d 55/18
U.S. Cl. 305—11                     5 Claims

ABSTRACT OF THE DISCLOSURE

Sealed track chain joint having a bushing, a link counterbore receiving and housing therein the thrust end portion of the bushing, and a floating end-face seal in the link adjacent said thrust end portion and forming within the link a radial interface of sealing contact at least preferably in a ring at the outer end periphery of the bushing or, at most, in an outermost ring of pressure contact spaced apart radially outwardly from the bushing.

---

Figure 7:
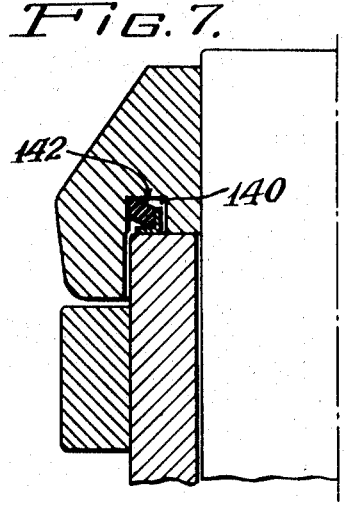

This is a division of application Ser. No. 611,463, filed Jan. 24, 1967, now Patent No. 3,437,385 which was a continuation-in-part of Ser. No. 576,152 filed Aug. 30, 1966, now Patent No. 3,402,974.

The present invention relates to sealing means for chain link joints, particularly for the link joints in the endless track chain of a crawler vehicle. Such chain is provided with sealed in lubricant at the factory, and the sealing extends the life of joints by excluding contaminant from the lubricant.

In accordance with past practice, a sealed track link joint includes, besides a lubricant coated pin and a surrounding bushing between which the relative rotation occurs, a link having a bore to embrace the pin, a first re-bore to receive and house either the thrust end of the bushing or the seal, and sometimes a second re-bore to receive the seal in case the first re-bore constitutes solely a bushing counterbore allocated to the bushing. Unless lubricant is effectively sealed thereamongst, the pin, link, and bushing parts tend to wear because of the relative rotation referred to.

A composite seal having a rubber back-up portion has been found especially effective in retaining the lubricant. It is therefore the practice to install such seal in direct contact with the end of the bushing, the locations of the respective bushing end and of the area of sealing contact thus made therewith being generally at the points most convenient in the particular arrangement of a joint.

Such an arrangement can consequently lead to difficulties because of failure of an existing joint to properly house or offset the thrusting end area of the bushing and/or the edge of the sealing contact area from direct infiltering of contaminant, i.e., provision of no offset axially from the plane between the hinged links, or because of failure to seal on the outside of thrust area of the thrusting end of the bushing, or because of failure to employ the thrusting end of the bushing as a bottoming means to set the space to receive the composite seal, thereby failing to properly gauge the pre-load on the seal and at the same time failing to isolate the rubber from the severity of the side thrust reaction in the chain.

Figure 8:
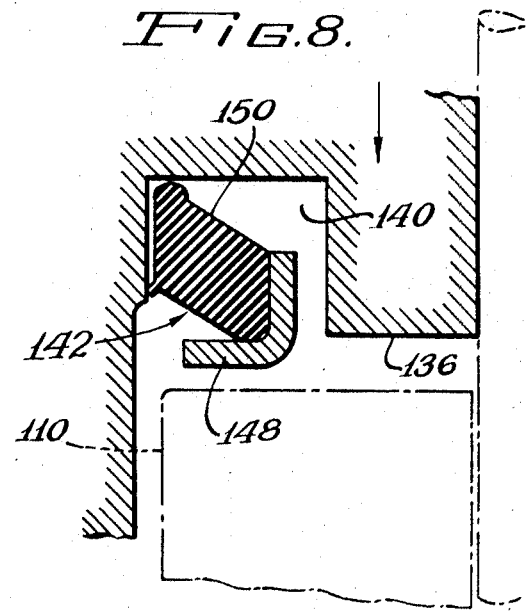
Figure 9:
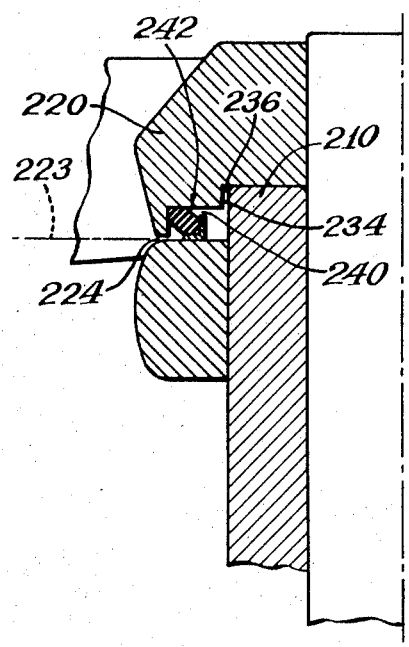
Figure 10:
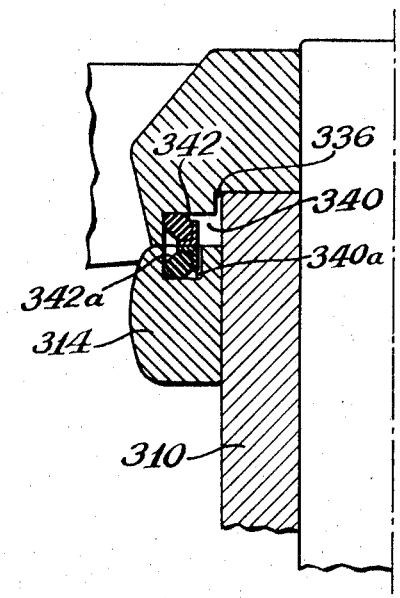

The foregoing difficulties are materially reduced if not substantially eliminated by my invention, in which the bushing thrust end and the seal cooperate to set the spacing and perform the outside sealing, respectively, and in which the edges of the bushing thrust face and/or the seal face are axially offset from the plane of direct entry of contaminant, all as will now be explained. Further features, objects, and advantages will either be specifically pointed out or become apparent when, for a better understanding of the invention, reference is made to the following description, taken in conjunction with the accompanying drawings which show a preferred embodiment thereof and in which:

FIGURES 1, 2 and 3, which show a track joint embodying the present invention, are plan assembly, sectional detail, and isometric detail views, respectively;

FIGURES 4, 5, and 6 are each sectional detail views similar to, but to larger scale than, FIGURE 1;

FIGURES 7 and 8 are similar to FIGURES 4 and 5, respectively, but show a modified embodiment; and FIGURES 9 and 10 are similar to FIGURE 1 but each shows a different further modification.

In FIGURES 1, 2, 3, 4, 5, and 6, the bushing 10 as shown has a track pin 12 rotatably received therein and, at one end, an inner link portion 14 of a pair of track links embraces that end of the bushing 10. The inner link of the pair carries a relatively leading track shoe 16 secured thereto by bolts including a bolt 18.

A bored outer link 20, which embraces a corresponding end of the pin 12, has a bore 22 in which the pin is received. The link 20 also has an inner face 24 which mutually confronts the inner link portion 14 to define a space which is in the plane between the hinged links and which measures between about 0.000 and 0.010 inch. The link 20 carries a trailing track shoe 26 secured thereto by bolts including a bolt 28. The links are steel forgings.

A rotary cutting tool, not shown, is introduced in the direction of an arrow 30 (FIGURE 2) so as to remove the material and form the finished bore 22. A re-bore, indicated by an arrow 32 between the bore 22 and a cylindrical wall 34, forms a main portion 34a of the cylindrical wall 34 (FIGURE 5), and also forms the radially inwardly extending main floor of a counterbore 36 receiving, and confronted by, the adjacent end of the bushing 10. A re-bore indicated by an arrow 38 between the cylindrical wall and the main transverse floor of the counterbore 36 forms a seal recess 40 with a second floor and a general prolongation or continuation 34b of the main portion 34 of a cylindrical wall.

The re-boring can be done separately, or jointly so that the counterbore 36 and recess 40 are formed in one operation of the same tool.

A seal assembly 42, bonded together in one piece and having the shape of a Belleville washer is inserted, large end first, into the seal recess of the outer link 20 before that link is press fitted onto the adjacent end of the pin 12. An identical seal assembly 43a is similarly introduced into an identical companion outer link 20a before the latter is press fitted onto the opposite end of the pin 12. The finally assembled position of the companion link 20a is indicated by the broken lines 20b, the bushing 10 being at each of its opposite ends solidly bottomed in the bushing counterbore at that end.

The FIGURE 4 showing of the end face 44 of the bushing 10 is illustrative of treatment of the opposite end faces of the bushing according to my invention. The face 44 has concentric, coplanar rings of pressure contact, the inner one of which is a static seal made with the floor of the counterbore 36 in thrust transmiting relation, and the outer one of which is made with the small end of the seal assembly 42 in dynamic sealing relation. The gap illustrated in FIGURE 4 between the cylindrical wall 34 and the bushing 10 is shown greatly exaggerated, and in practice hardly more than a piloting amount of clearance is present so that the housed end of the bushing will stay fairly free from contaminant.

As indicated, the foregoing joint is provided with sealed in lubricant at the factory. The seal 42 seals in the lubricant along its ring of pressure contact with the bushing end face 44 and seals out any contaminant which may sift in along the cylindrical wall 34. While it is true that wear is inevitable along the cylindrical interface 46 of contact between pin and bushing because of large track tension forces and the shaking action of the track, wear of the thrust end face 44 of the bushing is kept at a minimum by the body of internal lubricant.

In FIGURE 6, the seal 42 axially foreshortens so that the wall thickens when compressed into place in the recess 40 by the bushing 10. It consists of a steel, bushing engaging sealing ring 48 of small diameter and an elastomeric back-up portion 50. The back-up portion is frusto conical in shape and generally conforms to a parallelogram in cross-section.

The back-up portion 50 extends axially and rearwardly from the ring 48, in inclined relation thereto, and with the small leading end being of the same diameter as, and rubber-to-metal bonded to the rear face of, the sealing ring 48. In one embodiment the cone angle, at the apex, of the seal assembly was slightly in excess of 45°. The seal assembly works and self-adjusts in service. With the prolongation 34b of the cylindrical bore wall, the assembly defines a self-purging gap at 41 (FIGURE 6) having an annular shape of decreasing thickness.

A large diameter, radially outer end 52 of the back-up portion has radial and axial engagement with the cylindrical wall part and floor part of the seal recess 40 which is spaced apart axially and radially outwardly from the sealing ring 48. In cooperation with the ring, the large end 52 places the back-up portion 50 in unrestricted axially and radially distortively compressed condition throughout the entire cross-section thereof between the engaged parts of the recess and the sealing ring. It is clear upon inspection of FIGURES 1 and 4 to 6 that the back-up portion is otherwise unconfined within the seal recess 40.

In service, each outer link 20 retains a sound counterbore, and can be reused when the pin and bushing have worn at interface 46 to the point that replacement or turning is necessary. One of the contributing factors is the inner ring of pressure contact which is metal-to-metal against the bushing end face 44 but which is coated with lubricant and unyieldingly takes the thrust of the so-called side loading of the chain. Another factor is the outer ring of pressure contact on the end face 44 which is metal-to-metal but coated with lubricant and which provides a floating seal. The back-up behind the outer ring of pressure contact comprises an elastomeric portion 50, freely acting in combined compression and shear, to axially yield and adapt over a wide range of adjustment due to variations such as manufacturing variations and tolerances. The final factor is the bushing counterbore 36, i.e., a counterbore in the outer link wherein the bushing and outer link overlap, protecting the joint and enabling the link to house substantially the entire thrust or outer end portion of the bushing therein.

The critical function of having the back-up portion press both radially inwardly and axially upon the seal ring member so that it is always forced into a centered position against the outer periphery of the bushing can be accomplished with an unbonded composite structure.

Such structure is illustrated in FIGURES 7 and 8. A composite seal assembly 142 within a seal recess 140 in a link has a back-up portion 150 provided with similarly inclined diagonal walls. However in contrast to the preceding embodiment, the end faces of the back-up portion 150 when viewed in cross-section are axially parallel to one another rather than parallel in radial planes. Nevertheless, the fundamental Belleville washer appearance is retained, with the back-up portion 150 being frusto-conical and conforming generally to a parallelogram in cross-section.

A sealing ring member 148 in the assembly has a generally L-shaped cross-section and, in lieu of the preceding bonded coupling, is frictionally coupled to the back-up portion due to receiving the small end of the latter in the included angle between a radial leg of the L-section and an axially extending leg of the L-section. Proper spacing is accomplished, to stress the composite seal without mashing it during assembly, by pressing a track pin bushing 110 against the seal assembly 142 until the bushing 110 solidly abuts the main floor of a link counterbore 136. Again, the entire cross-section of the back-up portion 150 is unrestrictively axially and radially distortively compressed. In one physically constructed embodiment of the invention, the cone angle, at the apex of the seal assembly 142, was slightly less than 120°.

If a seal recess 240 is provided which intersects the inner face 221 of an outer link 220 and the cylindrical wall 234 of a link counterbore 236 as shown in FIGURE 9, then a double offset of the thrust end of a bushing 210 can be obtained relative to the plane 223 between the two track links, although the wearing interface of the frictionally coupled composite seal assembly 242 is positioned planar to the space between those two links. By a frictionally coupled assembly of parts, I mean parts frictionally fixed one to another such as the hard-faced part which provides a friction drive to an end of the elastomeric back-up part, and an end of the elastomeric back-up part which provides a friction drive to the re-bore wall or floor or both.

If duplicate ones 342 and 342a of the frictionally coupled seal assemblies are provided in mirror image relation to one another so as to retain an outermost ring of pressure contact spaced apart radially outwardly from a bushing 310 in the joint as shown in FIGURE 10, then the added wearing interface is against a seal-ring member rather than against an inner link portion 314, although an additional seal recess 340a must be provided which confronts the existing seal recess 340 and each of which equally retains the seal assemblies in part. In any case in the re-bore forming the seal recess 340, that recess is coextensive in depth with no more than a major portion of the counterbore 336, and the recess forms merely a lateral extension of a portion of the latter.

My floating seal joint is primarily adapted to crawler vehicles, for use in the endless track assemblies thereof in which the paired links form a chain at each side. The chain and track shoes are conventional in that respect, the crawler track construction and operation being generally known as shown in expired Patent No. 2,376,864. All joints in the endless track are sealed at each end in the same way, except possibly for the master pin joint, not shown.

The language herein calling for embracing one part of a pair by the other part, is in reference to using a pressed together assembly in which an interference fit between the pair of parts prevents relaaive rotation and prevents endwise shift of the embraced part. By a back-up portion which is elastomeric I mean a compounded natural or synthetic rubber, such as Buna-N material which is a readily available, abrasion resistant, seal elastomer in commercial use. Contaminant has reference to silt, dirt, and other abrasion-causing foreign matter.

Variations within the spirit and scope of the invention described are equally comprehended by the foregoing description.

What is claimed is:

1. In an endless track, chain, or the like having a bushing and a pin joint;

the combination with the bushing and a companion pin received therein, of a bored link embracing an end of the pin, having a bore in which the pin is so embraced and which is adapted to intersect a bushing counterbore, said link further having an inner face;

a rebore in the link between and intersecting the bore and the inner face, comprising a bushing counterbore formed with a cylindrical wall for receiving, and formed with a transverse main floor for engaging, the end of the busing piloted therein;

a second rebore in the link between the cylindrical wall and main floor, forming a seal recess having a second floor and providing a general prolongation of said cylindrical wall;

the main and second floors characterized respectively by a deep offset from, and a deeper offset from, the inner face of the link; and a seal in the recess engaging said piloted end of the bushing;

said main floor engaging the piloted end of the bushing in a ring of pressure contact in thrust transmitting relation, and said seal engaging the piloted end in a ring of pressure contact in sealing relation, and providing an inner and outer ring arrangement wherein each is formed by metal-to-metal contact and the thrust transmitting ring is the inner one and the sealing ring is the outer one;

said seal comprising an assembly of a large, resiliently flexible back-up portion and a relatively inflexible and small, metal sealing ring member;

said back-up portion having a small diameter end of a size corresponding to the metal ring member and rotatably coupled to the metal at the rear thereof, and generally conforming to a parallelogram in cross-section, the large diameter end of the back-up portion being adapted to transmit the seal assembly reaction and, in cooperation with said ring, placing said back-up portion in unrestricted axially and radially distortively compressed condition throughout the entire cross-section thereof, and being otherwise unconfined within said seal recess;

the back-up portion of the seal assembly conforming to said parallelogram in cross-section, in the respect of having two parallel walls extending axially rearwardly from the ring member, in inclined relation thereto, and with the small end engaging primarily a cylindrical surface of the ring member, and with the large end of the back-up portion engaging primarily only the cylindrical surface of said general prolongation of said cylindrical wall to transmit the seal assembly reaction.

2. In an endless track, chain, or the like having a bushing and pin joint:

the combination with the bushing and a companion pin received therein, of a bored link embracing an end of the pin, having a bore in which the pin is so embraced and which is adapted to intersect a bushing counterbore, said link further having an inner face;

a rebore in the link between and intersecting the bore and the inner face, comprising a bushing counterbore formed with a cylindrical wall for receiving, and formed with a transverse main floor for engaging, the end of the bushing piloted therein;

a second rebore in the link between the cylindrical wall and main floor, forming a seal recess having a second floor and providing a general prolongation of said cylindrical wall;

the main and second floors characterized respectively by a deep offset from, and a deeper offset from, the inner face of the link; and a seal in the recess between and engaging primarily only the cylindrical wall and said piloted end of the bushing;

said main floor engaging the piloted end of the bushing in a ring of pressure contact in thrust transmitting relation, and said seal engaging the piloted end in a ring of pressure contact in sealing relation, and providing an inner and outer ring arrangement wherein each is formed by metal-to-metal contact and the thrust transmitting ring is the inner one and the sealing ring is the outer one;

said seal comprising an assembly of a large, resiliently flexible back-up portion and a relatively inflexible and small, metal sealing ring member;

said back-up portion having a small diameter end of a size corresponding to the metal ring member and frictionally coupled to the metal at the rear thereof, and generally conforming to a parallelogram in cross-section, the large diameter end of the back-up portion being adapted to transmit the seal assembly reaction and, in cooperation with said ring, placing said back-up portion in unrestricted axially and radially distortively compressed condition throughout the entire cross-section thereof, and being otherwise unconfined within said seal recess; and an inner link portion embracing the bushing at a point spaced away from the piloted end thereof, and confronting the inner face of the bored link.

3. The invention of claim 2, the seal assembly having conical angularity characterized by an apex angle of approximately 45°, said sealing ring member as viewed in cross-section having metal portions forming a general L-shape, and including a cylindrical portion at the rear frictionally embraced by the back-up portion at the small end of the latter.

4. The invention of claim 2, characterized by the prolongation of the cylindrical wall within the seal recess and the confronting seal assembly within the seal recess presenting an annular gap of decreasing thickness to contaminant sifting past said inner face of the bored link.

5. In the inner face structure of a track link, said link having a primary bore in which the link receives a track pin, said link being of the bushing counterbore type, in the inner face of which the received end of a bushing is adapted to be piloted:

the combination with the bushing, of a counterbore in the link which for a major portion is coextensive with and which houses the piloted end of the bushing in the link, said counterbore having a main floor;

a continuation of the counterbore forming a seal recess confronting a radially outer end portion of the piloted end;

an end face seal assembly in said recess comprising a sealing ring member, and an elastomeric back-up portion generally conforming to a parallelogram in cross-section;

the bushing being piloted at the end in the counterbore so that the end face at that end is subjected to coplanar, essentially concentric rings of pressure contact, the inner one of which is afforded by the main floor of the counterbore in a thrust transmitting relation, and the outer one of which is afforded by the ring member in a floating seal relation;

said back-up portion extending radially outwardly and axially rearwardly from said sealing ring member, in inclined relation thereto, with a leading end coupled rotatably fast to the rear of the sealing ring;

said back-up portion providing axial and radial engagement, by means of the other end thereof, with a part of said seal recess offset both radially outwardly of and axially from said sealing ring member and, in cooperation with said member, placing said back-up portion in unrestricted axially and radially distortively compressed condition throughout the entire cross-section thereof between said recess part and said sealing ring member;

said back-up portion except for its engagement with said sealing ring member and said part being otherwise unconfined within said seal recess.

References Cited

UNITED STATES PATENTS

| 2,264,739 | 12/1941 | Boden. | |
|---|---|---|---|
| 2,699,974 | 1/1955 | Deffenbaugh | 305—11 |
| 3,241,843 | 3/1966 | Hatch | 277—92 |
| 3,336,086 | 8/1967 | Reinsma | 305—11 |
| 3,402,974 | 9/1968 | Deli | 305—11 |

RICHARD J. JOHNSON, Primary Examiner